United States Patent [19]
Haake

[11] Patent Number: 4,697,676
[45] Date of Patent: Oct. 6, 1987

[54] SAFETY DEVICE FOR GARAGE DOORS AND THE LIKE

[76] Inventor: Werner Haake, Eschlohn 24, D-4286 Südlohn, Fed. Rep. of Germany

[21] Appl. No.: 905,677

[22] Filed: Sep. 9, 1986

[30] Foreign Application Priority Data

Sep. 13, 1985 [DE] Fed. Rep. of Germany ....... 3532754

[51] Int. Cl.⁴ ........................ F16D 57/10; E05D 17/00
[52] U.S. Cl. ........................................ 192/8 R; 192/148
[58] Field of Search .................... 192/7, 8 R, 144, 148; 49/322; 160/309, 313, 191, 192, 188; 188/82.3, 82.34, 82.4, 31, 60

[56] References Cited

U.S. PATENT DOCUMENTS

| | | | |
|---|---|---|---|
| 838,024 | 12/1906 | Hendricks | 188/82.3 |
| 1,867,409 | 7/1932 | Juergens | 192/8 R |
| 1,878,333 | 8/1932 | Scott | 188/82.3 |
| 1,948,082 | 2/1934 | Stangeland | 188/82.4 |
| 2,097,242 | 10/1937 | Robinson | 160/191 |
| 2,171,458 | 8/1939 | Swartz | 192/8 R |
| 2,626,027 | 1/1953 | Anderson | 192/8 R |
| 3,129,040 | 4/1964 | De Rose | 160/188 |
| 4,091,900 | 5/1978 | Murteza | 192/8 R |

FOREIGN PATENT DOCUMENTS

| | | | |
|---|---|---|---|
| 263311 | 8/1913 | Fed. Rep. of Germany | 188/82.3 |
| 3300331 | 5/1984 | Fed. Rep. of Germany | |
| 3402343 | 8/1985 | Fed. Rep. of Germany | 49/322 |

*Primary Examiner*—Lawrence Staab
*Assistant Examiner*—Joseph J. Meter
*Attorney, Agent, or Firm*—Peter K. Kontler

[57] ABSTRACT

A safety device for garage doors wherein the door can be pulled down against the opposition of one or more torsion springs acting upon a horizontal shaft has a housing for a gear which is non-rotatably mounted on the shaft and whose peripheral teeth and tooth spaces are adjacent a set of recesses the the housing. A plastic casing which is biased by the torsion springs normally maintains in deformed condition at least one coil spring which reacts against the housing and tends to rotate the casing relative to the gear so that several ramps which are adjacent to discrete pockets of the casing expel from the recesses spherical blocking elements which normally extend partly into the recesses and partly into the adjacent pockets. This results in partial entry of blocking elements into the adjacent tooth spaces to thus hold the shaft against rotation relative to the housing in the event of breakage of the torsion springs.

16 Claims, 6 Drawing Figures

SAFETY DEVICE FOR GARAGE DOORS AND THE LIKE

BACKGROUND OF THE INVENTION

The present invention relates to safety devices for garage doors and the like. More particularly, the invention relates to improvements in safety devices which can be used in or with doors of the type wherein the panel or panels tend to assume a predetermined position in response to the action of gravity or another force which is normally counteracted by one or more springs, weights or the like.

Commonly owned German Pat. No. 33 00 331 discloses a safety device whose blocking or locking action is dependent upon centrifugal force. A horizontal shaft of the garage door carries a gear which rotates relative to a housing and relative to a casing. The casing is rotatable, within limits, with respect to the housing under the action of a coil spring tending to maintain the casing in an angular position in which the casing and the housing cooperate to prevent rotation of the gear relative to the housing, for example, in response to failure of one or more torsion springs which tend to rotate the shaft and the gear thereon to a position in which the coil spring is compressed. The housing and the casing have recesses which can receive portions of spherical blocking elements in the tooth spaces of the gear. The blocking elements can enter the recesses of the housing and the casing only when the coil spring is free to expand so that the blocking elements then prevent further rotation of the shaft and of the gear thereon relative to the housing.

The patented safety device has been found to be highly effective in actual use. However, its operation is dependent (at least to a certain degree) upon the action of centrifugal force which tends to propel the blocking elements from the respective tooth spaces of the gear. Furthermore, the patented safety device employs a reasonably large number of blocking elements which must orbit relative to the housing whenever the shaft for the gear is set in rotary motion. Such orbital movements of the blocking elements can generate some noise. Moreover, uncontrolled or unauthorized manipulation of the casing can result in disengagement of the blocking elements and in rapid discent of the garage door with attendant likelihood of damage to the door and injury to the person or persons standing nearby.

OBJECTS AND SUMMARY OF THE INVENTION

An object of the invention is to provide a safety device which can be used in or on existing garage doors or the like as a superior substitute for conventional safety devices.

Another object of the invention is to provide a safety device which can operate properly with a single blocking element or with a relatively small number of blocking elements.

A further object of the invention is to provide a safety device which is less likely to be accidentally disengaged than the conventional safety devices.

Still another object of the invention is to provide a safety device which generates little or no noise and whose operation is not dependent upon the action of centrifugal force.

A further object of the invention is to provide a door which embodies, or is combined with, the above outlined safety device.

An additional object of the invention is to provide a novel and improved support and a novel and improved displacing member for one or more blocking elements which can be used in the above outlined safety device.

The invention resides in the provision of a safety device which can be utilized on, or in conjunction with gravity-operated garage doors and the like. The improved safety device comprises a support (for example, a stationary annular housing which is secured to the wall of a garage for motor vehicles), and a rotary gear having alternating peripheral teeth and tooth spaces, the support has at least one recess which is adjacent a portion of the gear in the region of the teeth and tooth spaces and the safety device further comprises a displacing member which is movable relative to the support and has a portion adjacent a portion of the periphery of the gear, means for biasing the displacing member to at least one first position relative to the support, and resilient means for urging the displacing member away from the first position to at least one second position against the opposition of the biasing means so that the displacing member leaves the first position and assumes the second position in response to a failure of the biasing means. Such biasing means can comprise a torsion spring which tends to rotate the displacing member in a first direction, and the resilient means can comprise one or more coil springs which can be installed in the support and tend to turn the displacing member in the opposite direction. The displacing member has a pocket, which is provided in the aforementioned portion of the displacing member, and a ramp which is adjacent the pocket and slopes toward the adjacent teeth and tooth spaces of the gear. The pocket is in register with the recesses of the support in the first position of the displacing member. The safety device further comprises a blocking element (for example, a spherical blocking element) which is received in the recess of the support and in the pocket of the displacing member in the first position of the displacing member and is dimensioned in such a way that it is bypassed by the teeth of the gear in the first position of the displacing member. The ramp is inclined and configurated in such a way that it partially expels the blocking element from the recess of the support and into the adjacent tooth space of the gear in response to movement of the displacing member to its second position so that the blocking element then prevents rotation of the gear relative to the support.

The depth of the recess in the radial direction of the gear can equal or approximate the depth of the pocket.

The gear is preferably rotatable about a substantially horizontal axis, and the recess is preferably disposed at or close to the six o'clock position of the gear below the horizontal axis.

The support is preferably provided with a stop which is adjacent the recess and is engaged by the blocking element when the blocking element extends into one of the tooth spaces. The support of such safety device can be provided with a cam face which surrounds a portion at least of the recess to guide the blocking element toward the stop in response to movement of the displacing member from its first to its second position.

The displacing member can consititute an annulus which is made of or contains a plastic material.

The surfaces which surround the tooth spaces of the gear are preferably complementary to a portion of the surface of the blocking element.

The tooth spaces can be elongated in the circumferential direction of the gear so that a portion of the blocking element is receivable in a tooth space with some freedom of angular movement of the gear relative to the blocking element. The provision of elongated tooth spaces facilitates entry of a portion of the blocking element into an adjacent tooth space in response to movement of the displacing member from its first to its second position.

In accordance with a modification, the portion of the displaying member can surround at least the major part of the gear, and the blocking element can contain a ferromagnetic material. The support is then provided with means for magnetically attracting the blocking element into the recess. The aforementioned portion of the displacing member can be provided with a plurality of pockets which surround the gear, and the support can be provided with a plurality of recesses, one for each pocket. The attracting means of such safety device can comprise a magnetic tape, and the safety device can comprise two or more blocking elements each of which is received in a different recess.

As mentioned above, the displacing member can surround the entire gear and is preferably rotatable relative to the support between the first and second positions. The support can consititute a ring, the same as the displacing member, and the displacing member can be rotatably affixed to the support, for example, with the interposition of one or more antifriction bearings.

In accordance with a further modification, the support can be provided with two recesses which are adjacent each other in the axial direction of the gear, and the displacing member of such safety device has two pockets each of which registers with a different recess in the first position of the displacing member. This safety device further comprises an additional blocking element so that each of the recesses and the registering pocket receives a discrete blocking element in the first position of the displacing member. Such construction of the support and displacing member, and the utilization of several blocking elements, contributes to greater reliability of the safety devices.

The novel features which are considered as characteristic of the invention are set forth in particular in the appended claims. The improved safety device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
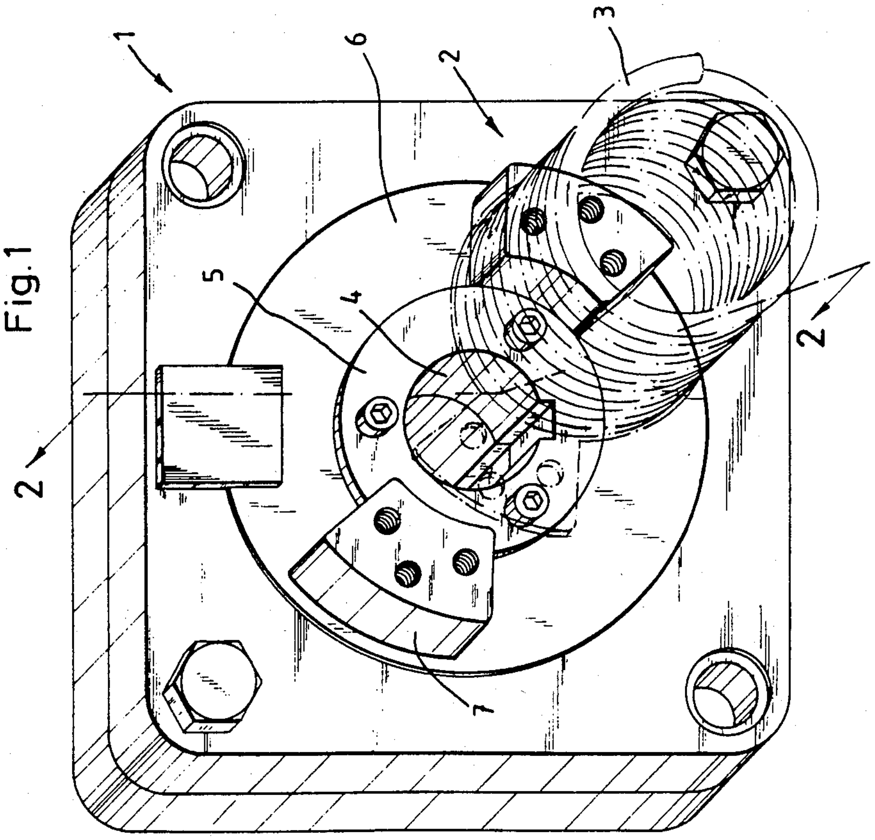
FIG. 1 is a perspective view of the improved safety device, with the shaft which carries the torsion spring omitted.
Figure 6:
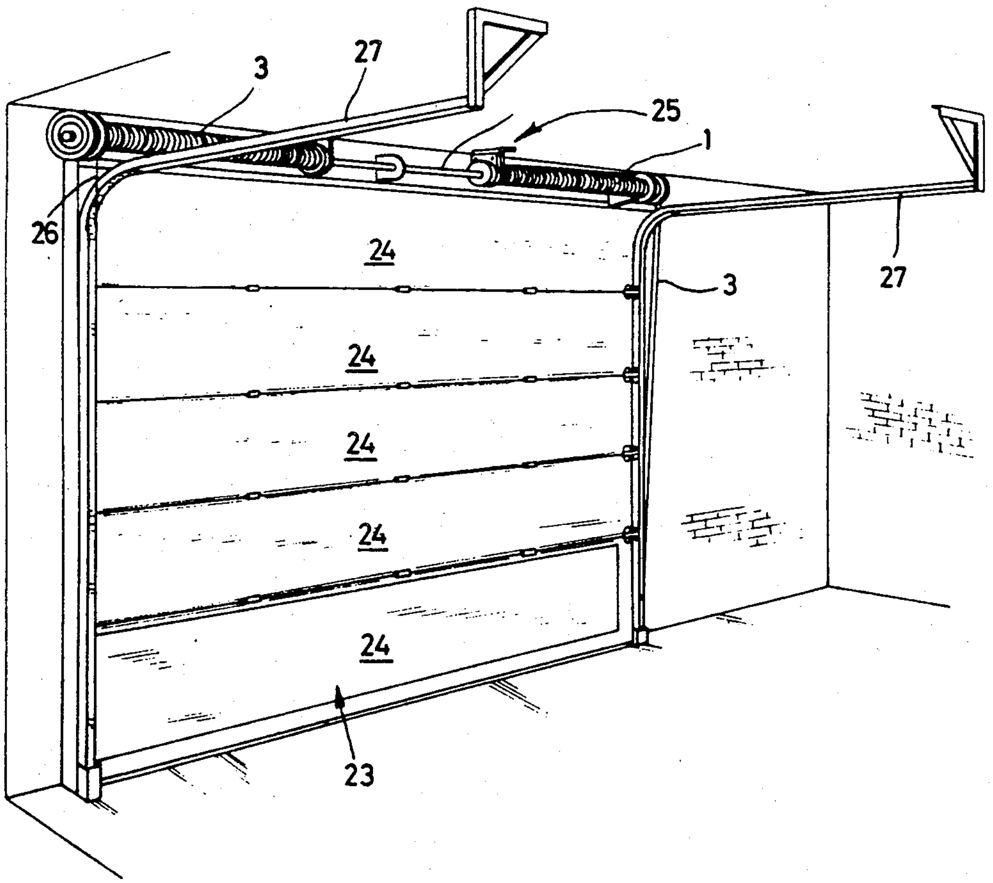
FIG. 6 is a perspective view of a garage door which is equipped with the safety device of the present invention.

Referring first to FIG. 6, there is shown a garage door 23 in its closed or operative position. The door 23 comprises a plurality of elongated horizontal panels 24 which are pivotable relative to each other. The panels 24 are guided for movement along two suitably configurated guide rails 27 in customary fashion and are suspended on cables 26. The cables are convoluted around pulleys at the respective ends of a horizontal shaft 25 which is surrounded by two torsion springs 3 serving as a means for biasing the shaft 25 in a first direction. The purpose of the torsion springs 3 is to facilitate lifting of the door 23 to the open position. At such time, the springs 3 dissipate energy and assist the person in lifting the door from the position which is shown in FIG. 1. The springs 3 store energy when the door 23 is returned to the illustrated closed position. It is clear that the door 23 can be moved by hand or by a suitable motor, not shown.

The means for preventing accidental or uncontrolled rapid movement of the door 23 to the one or the other position comprises a safety device 1 the details of which are shown in FIGS. 1–4. The safety device 1 constitutes an improvement over and a further development of the safety device which is disclosed in commonly owned German Pat. No. 33 00 331.

Figure 2:
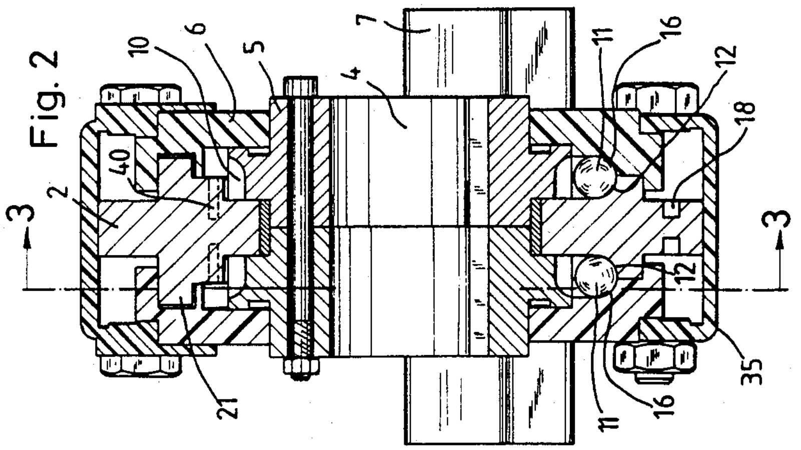
FIG. 2 is a sectional view substantially as seen in the direction of arrows from the line 2—2 of FIG. 1.

Referring now to FIGS. 1 and 2, the safety device 1 comprises a stationary support in the form of a ring-shaped housing 2 which is non-rotatably secured to the wall of the garage shown in FIG. 1. The shaft 25 has be omitted in FIGS. 1 and 2 for the sake of clarity. FIG. 1 merely shows one of the two torsion springs 3 which serve as a means for biasing an annular synthetic plastic displacing member or casing 6 relative to the support 1 in a determined direction. The rearmost convolution of the torsion spring 3 which is shown in FIG. 1 abuts one of two sector-shaped extensions 7 which can constitute integral parts of or are separably secured to the casing 6. The shaft 25 for the torsion spring 3 extends through an axial passage 4 provided in a gear 5 which is affixed to and thus shares all angular movements of the shaft relative to the casing 6 and support 2. The gear 5 is rotatable relative to the casing 6 and the casing is rotatable relative to the support 1.

Figure 4:
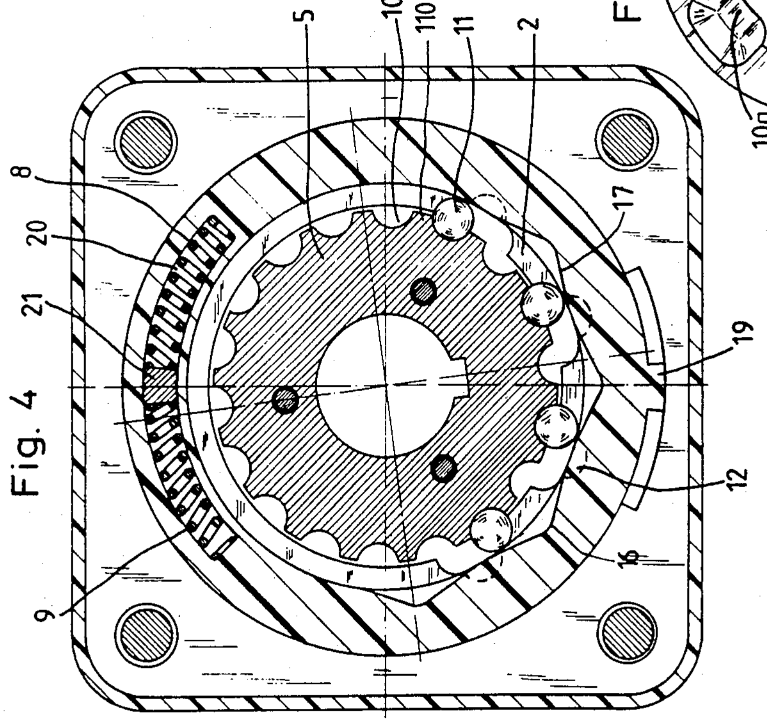
FIG. 4 shows the structure of FIG. 3 but with the displacing member in one of its second positions.
Figure 3:
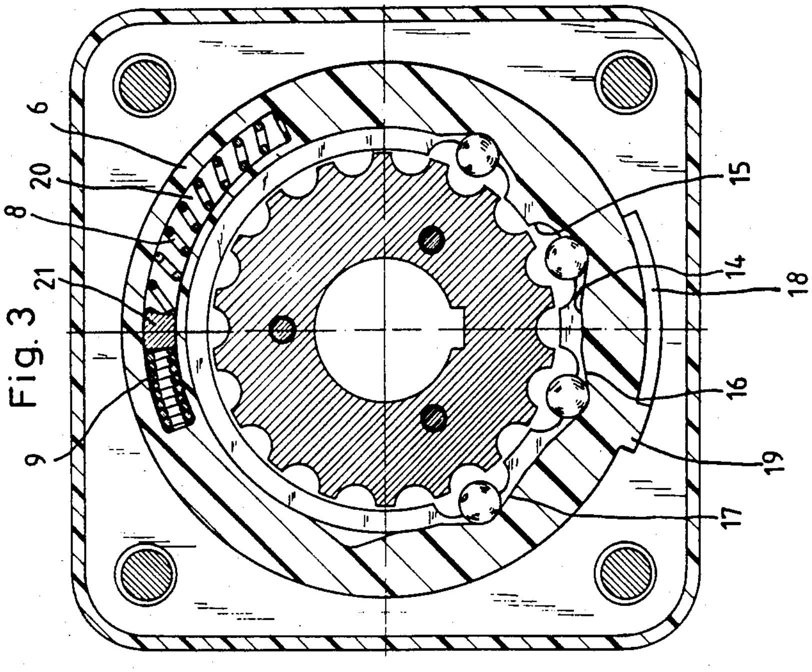
FIG. 3 is a sectional view as seen in the direction of arrows from the line 3—3 of FIG. 2 and shows the displacing member in one of its first positions.

FIGS. 3 and 4 show that the casing 6 is provided with an arcuate recess 20 having its center of curvature on the axis of the gear 5 and receiving two resilient elements in the form of coil springs 8 and 9 disposed at opposite sides of a stop 21 which is an integral part of or is secured to the stationary support 2. The bias of the torsion spring 3 is greater than the bias of the spring 8 or 9. Therefore, when the torsion spring 3 is intact, it biases the casing 6 to one of two first positions, for example, to the first position which is shown in FIG. 3. If the torsion spring 3 is removed or breaks, the spring 9 is free to return the casing 6 to a neutral position (see FIG. 4) in which the bias of the spring 9 upon the stop 21 of the support 2 is identical with and is counteracted by the bias of the spring 8.

FIGS. 3 and 4 show that the periphery of the gear 5 is provided with a set of equidistant tooth spaces 10 which alternate with teeth 110 and are surrounded by the casing 6 as well as by the support 2. The configuration of surfaces surrounding the tooth spaces 10 is such that the tooth spaces can receive portions (nearly one-half) of spherical blocking elements 11 which normally assume the positions shown in FIG. 3 so that they do not interfere with rotation of the gear 5 and shaft 25 relative to the support 2 and casing 6. The outer portions of the four illustrated blocking elements 11 are received in complementary recesses 12 which are provided in the lower portion of the support 2 at a level below the horizontal axis of the shaft 25 and gear 5. The depth of the recesses 12 is sufficient to ensure that the spherical blocking elements 11 therein do not interfere with the travel of teeth 110 along an endless path surrounding the shaft 25.

Figure 5:
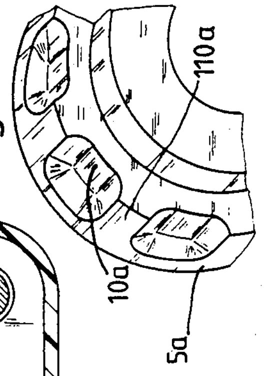
FIG. 5 is a fragmentary perspective view of a modified gear.

Entry of blocking elements 11 into the tooth spaces of the gear can be facilitated if the tooth spaces are elongated in the direcition of rotation of the gear so that a blocking element 11 which is received in such an elongated tooth space allows for some limited angular movements of the gear relative to the support 2. This is shown in FIG. 5 wherein the gear 5*a* has an annulus of equidistant elongated tooth spaces 10*a* alternating with teeth 110*a*. It is clear that the improved safety device can also operate with barrel-or roller-shaped blocking elements without departing from the spirit of the invention. The spherical blocking elements are preferred at this time because they are least likely to block or jam between the support 2 and casing 6 on the one hand and the gear 5 or 5*a* on the other hand.

The maximum width of the space between the lower portion of the support 2 and adjacent teeth 110 of the safety device 1 which is shown in FIGS. 1–4 is less than the diameter of a blocking element 11. The illustrated support 2 is provided with four equidistant recesses 12 having deepmost portions bounded by surfaces which are complementary to those of the blocking elements 11. As shown in FIG. 3, the blocking elements 11 extend into the respective recesses 12 in such a way that they can be readily bypassed by the teeth 110 when the shaft 25 is called upon to rotate the gear 5.

Each recess 12 is flanked by two cam faces 14 which slope toward the adjacent teeth 110 and tooth spaces 10 so as to ensure that, when a spherical blocking element 11 is expelled from the adjacent recess 12, the blocking element is compelled to move toward the axis of the shaft 25 and to enter the oncoming tooth space 10.

The support 2 is further provided with stops 15 which are the outermost boundaries of the recesses 12. Each cam face 14 is disposed between the deepmost portion of the respective recess 12 and one of the stops 15. This need not necessarily apply for the two lowermost recesses 12 of FIGS. 3 or 4. The safety device 1 can be operative in one or two directions. The configuration of the gear 5, support 2 and casing 6 of FIGS. 1 to 4 is such that the safety device 1 is operative regardless of whether the casing 6 begins to turn in a clockwise or in a counterclockwise direction.

That portion of the casing 6 which is disposed below the level of the horizontal axis of the gear 5 is formed with four equidistant pockets 16 each of which is in register with one of the recesses 12 when the casing 6 assumes the (first) position of FIG. 3. The depth of the pockets 16 can match or closely approximate the depth of the respective recesses 12.

Each pocket 16 is flanked by two ramps 17 which slope toward the adjacent teeth 110 and tooth spaces 10 of gear 5 so as to ensure that the blocking elements 11 are expelled from the deepmost portions of the respective recesses 12 as soon as the casing 6 begins to turn relative to the support 2. This ensures that the blocking elements 11 roll along the respective cam faces 14 and enter the oncoming tooth spaces 10 to positively prevent any further rotation of the gear 5 and shaft 25 in the respective direction when the blocking elements 11 reach the adjacent stops 15 of the support 2.

The casing 6 can be freely rotatably mounted on or in the support 2 for angular movement about one or more antifriction bearings (not specifically shown), for example, in a manner as disclosed in the aforemetioned commonly owned German Patent. However, once the bias of the torsion spring or springs 3 upon the shaft 25 (and hence upon the casing 6) is terminated, the coil springs 8 and 9 cooperate to automatically move the casing 6 to the (second) position which is shown in FIG. 4. The angular movement of the casing 6 relative to the support 2 is terminated when the bias of the coil spring 8 matches or closely approximates the bias of the coil spring 9.

If desired or necessary, the safety device 1 can be provided with additional means for ensuring that the casing 6 can rotate only within limits relative to the support 2. This is shown in the lower portions of FIGS. 3 and 4 wherein a radially outwardly extending protuberance 19 of the casing 6 extends into an arcuate slot or groove 18 of the housing or support 20. The length of the groove 18 (as measured in the circumferential direction of the casing 6) and the length of the protuberance 19 derermine the maximum extent of angular movability of the casing 6 relative to the support 2.

A casing 6 which is made from a suitable synthetic plastic material is preferred at this time because this contributes to lower cost and lower weight of the safety device 1. However, it is equally possible to employ a metallic casing or a casing which consists in part of metal and in part of another material (such as a plastic substance).

FIG. 2 shows that the stationary support 2 can be provided with two seats of recesses 12, and the same applies for the casing 6 which can have two sets of pockets 16. The safety device comprises two sets of spherical or otherwise configurate blocking elements 11, on for each of the recesses 12 or pockets 15. Such construction of the safety device contributes to greater stability and reliability as well as to a more uniform distribution of stresses at both sides of a plane which extends at right angles to the axis of the gear 5. The gear 5 of such safety device is preferably assembled of two halves (see FIG. 2) which are held together by bolts and nuts, by rivets or by other suitable coupling means. The safety device can further comprises a ring-shaped hood 35 which surrounds the stationary support 2 and has internal guide surfaces for the radially outer portions of the two halves of the casing 6.

When the safety device is idle, namely when the garage door 23 is free to be lifted above or returned to the operative position of FIG. 6, the casing 6 assumes the angular position which is shown in FIG. 3 and in which the coil spring 9 is fully compressed by the stop 21 and casing 6 through the medium of the torsion spring or springs 3. At such time, the fully compressed coil spring 9 acts not unlike a solid block and bears against the respective side of the stop 21 in the groove 20 of the casing 6. The stop 21 is rigid with the stationary support 2.

If one or both torsion springs 3 happen to break, the coil spring 9 is free to dissipate energy and to turn the casing 6 from the first position of FIG. 3 to the second position of FIG. 4. This automatically results in expulsion of the four blocking elements 11 from their respective recesses 12 because the blocking elements are engaged by the oncoming ramps 17 of the casing 6 and are expelled from the deepmost portions of the respective recesses 12. This causes the expelled blocking elements 11 to roll along the respective cam faces 14 and to come to a halt as soon as they reach the respective stops 15 of the stationary support 2. At such time, or already during an earlier stage of movement of the casing 6 from the first position of FIG. 3 to the second position of FIG. 4, the radially inner portions of spherical blocking elements 11 penetrate into the oncoming tooth spaces 10 so that the gear 5 and the shaft 25 are automatically arrested not later than when the spherical elements 11 strike against the respective stops 15. As mentioned above, when the blocking elements 11 are fully recieved in the respective recesses 12 and in the registering pockets 16, they cannot interfere with orbital movements of tooth spaces 10 and teeth 110 about the axis of the shaft 25.

An important advantage of the safety device 1 is that the blocking elements 11 are stationary when the torsion springs 3 are intact. This reduces the likelihood of generation of noise because the blocking elements need not orbit about the axis of the shaft 25.

Another important advantage of the safety device 1 is that, once the casing 6 has accomplished the task of displacing the spherical rolling elements 11 from the respective recesses 12, any further or repeated angular movements of the casing 6 relative to the support 2 cannot influence the positions of the blocking elements 11. In other words, the blocking elements 11 continue to abut against the respective stops 15 under the action of the gear 5 so that unauthorized or unintentional turning of the casing 6 cannot entail accidental descent of the garage door 23 to its closed position.

A further important advantage of the safety device 1 is that the number of blocking elements 11 can be reduced well below that used in the safety device of the German Patent. As shown in FIGS. 3 and 4, the illustrated saftey device employs a total of four simple spherical blocking elements 11. The number of blocking elements can be reduced to three, two or one without departing from the spirit of the invention. On the other hand, it is equally within the purview of the invention to provide the support 2 with a larger number of recesses 12 (for example, with recesses forming an annulus all the way around the gear 5) and to provide the casing 6 with an equal number of pockets 16. Each pocket 16 is in register with one of the recesses 12 in the first position of the casing corresponding to that of the casing 6 which is shown in FIG. 3. The modified safety device can comprise a larger number of blocking elements 11, for example, one for each recess 12. In order to ensure that the blocking elements which are disposed above the level of the horizontal axis of the shaft 25 will be held in their respective recesses 12, the modified safety device can be provided with a strip-shaped magnet which surrounds the recesses 12 of the support 2 and is embedded or otherwise installed in the support in a position to attract the adjacent blocking elements. A portion of a tape-like magnet is shown at 40. It is clear that the blocking elements which are to be used in conjunction with a magnetic tape-like attracting member consist of or contain a ferromagnetic material.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A safety device for garage doors and the like, comprising a support; a rotary gear having alternating peripheral teeth and tooth spaces, said support having at least one recess adjacent a portion of said gear in the region of said teeth and tooth spaces; a displacing member movable relative to said support and having a portion adjacent a portion of the periphery of said gear; means for biasing said displacing member to at least one first position relative to said support; resilient means for urging said displacing member away from said first position to at least one second position against the opposition of said biasing means so that said displacing member leaves said first position and assumes said second position in response to a failure of said biasing means, said displacing member having a pocket provided in said portion thereof and a ramp adjacent said pocket and sloping toward the adjacent teeth and tooth spaces, said pocket being in register with said recess in the first position of said displacing member; and a blocking element received in said recess and in said pocket in the first position of said displacing member and being dimensioned to be bypassed by said teeth in the first position of the displacing member, said ramp being arranged to partially expel said blocking element from said recess and into an adjacent tooth space in response to movement of said displacing member to said second position so that the blocking element then prevents rotation of said gear relative to said support.

2. The device of claim 1, wherein the depth of said recess in the radial direction of said gear equals or approximates the depth of said pocket.

3. The device of claim 1, wherein said gear is rotatable about a substantially horizontal axis and said recess is disposed at or close to the six o'clock position of said gear below said axis.

4. The device of claim 1, wherein said support has a stop adjacent said recess to be engaged by the blocking element when the latter extends into one of said tooth spaces.

5. The device of claim 4, wherein said displacing member has a cam face flanking a portion at least of said recess to guide the blocking element toward said stop in response to movement of said displacing member from said first to said second position.

6. The device of claim 1, wherein said displacing member comprises a plastic material.

7. The device of claim 1, wherein said gear has surfaces surrounding said tooth spaces and being complementary to a portion of the surface of said blocking element.

8. The device of claim 1, wherein said tooth spaces are elongated in the circumferential direction of said gear so that a portion of said blocking element is receivable in a tooth space with freedom of limited angular movement of said gear relative to said blocking element.

9. The device of claim 1, wherein said portion of said displacing member surrounds at least a major part of said gear and said blocking element contains a ferromagnetic material, said support having means for magnetically attracting said blocking element into said recess.

10. The device of claim 9, wherein said portion of said displacing member has a plurality of pockets.

11. The device of claim 10, wherein said support has a plurality of recesses, one for each of said pockets.

12. The device of claim 11, wherein said attracting means includes a magnetic tape.

13. The device of claim 1, wherein said displacing member is an annulus which surrounds said gear and is rotatable relative to said support between said first and second positions thereof.

14. The device of claim 1, wherein said blocking element is a sphere.

15. The device of claim 1, wherein said support surrounds said gear and said displacing member is a ring which is rotatably affixed to said support.

16. The apparatus of claim 1, wherein said support has two recesses adjacent each other in the axial direction of said gear and said displacing member has two pockets each of which registers with a different one of said recesses in the first position of said displacing member, and further comprising an additional blocking element so that each of said recesses and the registering pocket receives a discrete blocking element in the first position of said displacing member.

* * * * *